(12) United States Patent
Zhang et al.

(10) Patent No.: US 9,792,099 B2
(45) Date of Patent: Oct. 17, 2017

(54) SYSTEM AND METHOD FOR SUPPORTING DEPLOYMENT IN A MULTITENANT APPLICATION SERVER ENVIRONMENT

(71) Applicant: ORACLE INTERNATIONAL CORPORATION, Redwood Shores, CA (US)

(72) Inventors: Hong Zhang, Burlington, MA (US); Aseem Bajaj, Pleasanton, CA (US); Gerald Ingalls, Beaverton, OR (US); Amy Moon, Los Angeles, CA (US); Sumathi Gopalakrishnan, Fremont, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 14/747,718

(22) Filed: Jun. 23, 2015

(65) Prior Publication Data
US 2015/0370549 A1    Dec. 24, 2015

Related U.S. Application Data

(60) Provisional application No. 62/016,490, filed on Jun. 24, 2014.

(51) Int. Cl.
*G06F 9/44* (2006.01)
*G06F 9/445* (2006.01)

(52) U.S. Cl.
CPC . *G06F 8/60* (2013.01); *G06F 8/65* (2013.01)

(58) Field of Classification Search
None
See application file for complete search history.

(56) References Cited

U.S. PATENT DOCUMENTS

| 2002/0002635 A1* | 1/2002 | Astala | G06F 9/4443 719/328 |
| 2007/0022203 A1* | 1/2007 | Haberkorn | G06F 9/5027 709/230 |
| 2010/0325624 A1* | 12/2010 | Bartolo | G06F 8/61 717/176 |
| 2011/0213870 A1* | 9/2011 | Cai | H04L 67/10 709/223 |

(Continued)

*Primary Examiner* — Tuan Dao
*Assistant Examiner* — William C Wood
(74) *Attorney, Agent, or Firm* — Tucker Ellis LLP

(57) ABSTRACT

In accordance with an embodiment, described herein is a system and method for supporting deployment in an application server environment. A resource, for example an application or library, can be deployed to different resource groups in different partitions in a domain, to a resource group template referenced by the different resource groups, or to a domain-level resource group. One or more additional deployment operations can be performed on a deployed resource by a partition administrator or a system administrator. A deployment API can be provided to enable a plurality of deployment clients to perform the deployment operations, and can be used to derive partition information and target information for the deployment operations when the information is not provided by a partition administrator. Different deployment scopes are defined to allow a same resource to be deployed in different partitions of a domain and outside any partition in the domain.

20 Claims, 12 Drawing Sheets

(56) References Cited

U.S. PATENT DOCUMENTS

2012/0144044 A1* 6/2012 Verma .................... H04L 67/34
709/227
2014/0359552 A1* 12/2014 Misra ..................... H04L 67/12
717/100

\* cited by examiner

SYSTEM AND METHOD FOR SUPPORTING DEPLOYMENT IN A MULTITENANT APPLICATION SERVER ENVIRONMENT

CLAIM OF PRIORITY AND CROSS-REFERENCE TO RELATED APPLICATIONS

This application claims the benefit of priority to U.S. Provisional Application titled "SYSTEM AND METHOD FOR SUPPORTING DEPLOYMENT IN A MULTI-TENANT APPLICATION SERVER ENVIRONMENT", Application No. 62/016,490, filed Jun. 24, 2014; and is related to U.S. patent application titled "SYSTEM AND METHOD FOR SUPPORTING MULTITENANCY IN AN APPLICATION SERVER, CLOUD, OR OTHER ENVIRONMENT", application Ser. No. 14/601,883, filed Jan. 21, 2015; each of which above applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to application servers and cloud platform environments, and are particularly related to a system and method for supporting deployment in a multitenant application server environment.

BACKGROUND

Software application servers, examples of which include Oracle WebLogic Server (WLS) and Glassfish, generally provide a managed environment for running enterprise software applications. Recently, technologies have also been developed for use in cloud environments, which allow users or tenants to develop and run their applications within the cloud environment, and to take advantage of distributed resources provided by the environment.

SUMMARY

In accordance with an embodiment, described herein is a system and method for supporting deployment in an application server environment. A resource, for example an application or library, can be deployed to different resource groups in different partitions in a domain, to a resource group template referenced by the different resource groups, or to a domain-level resource group. One or more additional deployment operations can be performed on a deployed resource by a partition administrator or a system administrator. A deployment application programming interface (API) can be provided to enable a plurality of deployment clients to perform the deployment operations, and can be used to derive partition information and target information for the deployment operations when the information is not provided by a partition administrator. Different deployment scopes are defined to allow a same resource to be deployed in different partitions of a domain and outside any partition in the domain.

DETAILED DESCRIPTION

In accordance with an embodiment, in a multi-tenant environment, a domain can be sliced into one or more partitions, wherein each partition can host applications for a different tenant. A method and system can deploy applications or libraries to a partition, a domain-level resource group, or a resource group template in a domain.

In accordance with an embodiment, described herein is a system and method for supporting deployment in an application server environment. A resource, for example an application or library, can be deployed to different resource groups in different partitions in a domain, to a resource group template referenced by the different resource groups, or to a domain-level resource group. One or more additional deployment operations can be performed on a deployed resource by a partition administrator or a system administrator. A deployment APIs can be provided to enable a plurality of deployment clients to perform the deployment operations, and can be used to derive partition information and target information for the deployment operations when the information is not provided by a partition administrator. Different deployment scopes are defined to allow a same resource to be deployed in different partitions of a domain and outside any partition in the domain.

Application Server (e.g., Multi-Tenant, MT) Environment

Figure 1:
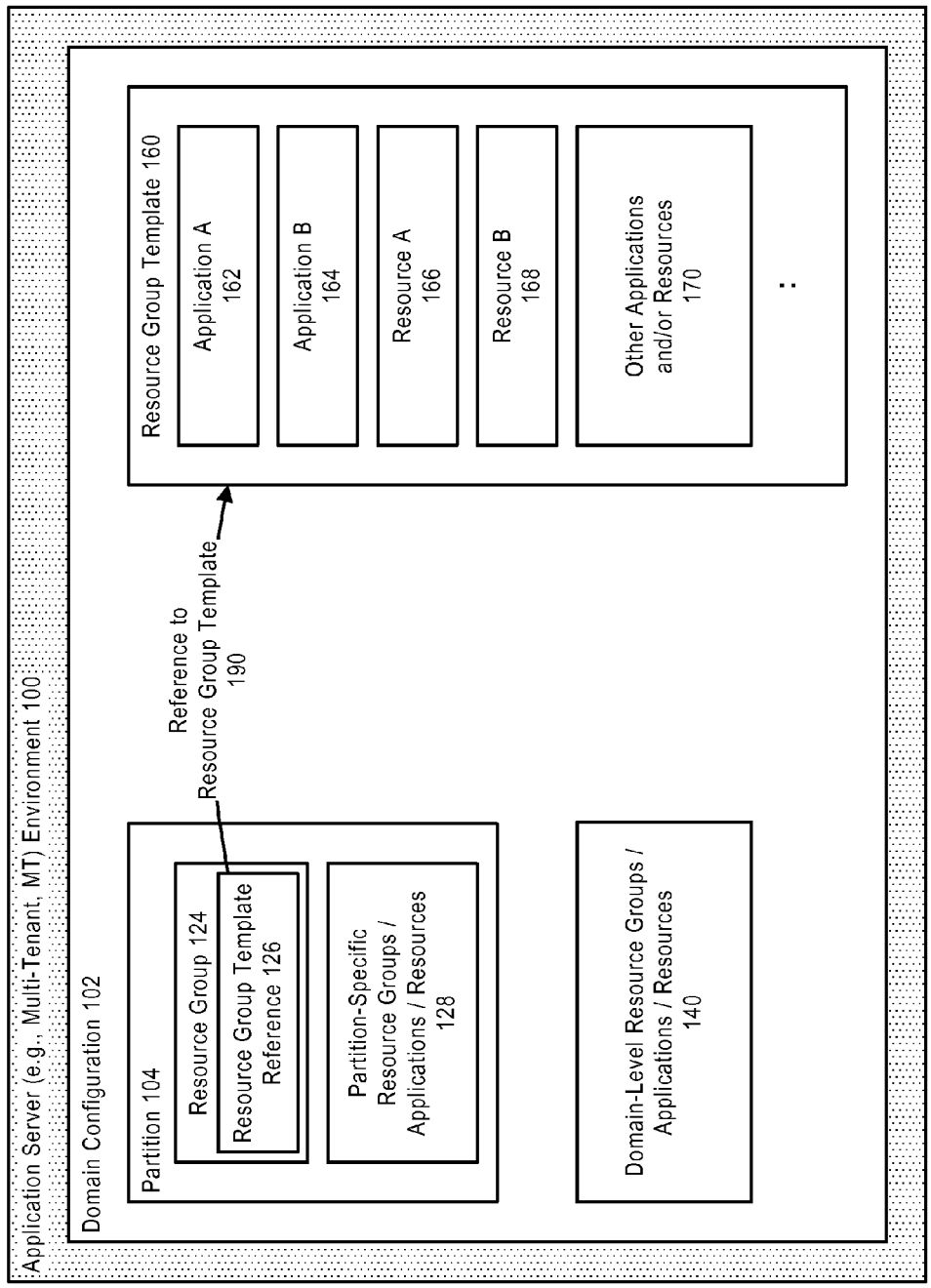
FIG. 1 illustrates a system for supporting multi-tenancy in an application server, cloud, or other environment, in accordance with an embodiment.

FIG. 1 illustrates a system for supporting multi-tenancy in an application server, cloud, or other environment, in accordance with an embodiment.

As illustrated in FIG. 1, in accordance with an embodiment, an application server (e.g., multi-tenant, MT) environment 100, or other computing environment which enables the deployment and execution of software applications, can be configured to include and operate according to a domain 102 configuration that is used at runtime to define an application server domain.

In accordance with an embodiment, the application server can include one or more partitions 104 that are defined for use at runtime. Each partition can be associated with a globally unique partition identifier (ID) and partition configuration, and can further include one or more resource groups 124, together with a reference to a resource group template 126 and/or partition-specific applications or resources 128. Domain-level resource groups, applications and/or resources 140 can also be defined at the domain level, optionally with a reference to a resource group template.

Each resource group template 160 can define one or more applications A 162, B 164, resources A 166, B 168, and/or other deployable applications or resources 170, and can be referenced by a resource group. For example, as illustrated in FIG. 1, resource group 124 in partition 104 can reference 190 resource group template 160.

Generally, a system administrator can define partitions, domain-level resource groups and resource group templates, and security realms; while a partition administrator can define aspects of their own partition, for example, by creating partition-level resource groups, deploying applications to the partition, or referencing specific realms for the partition.

Figure 2:
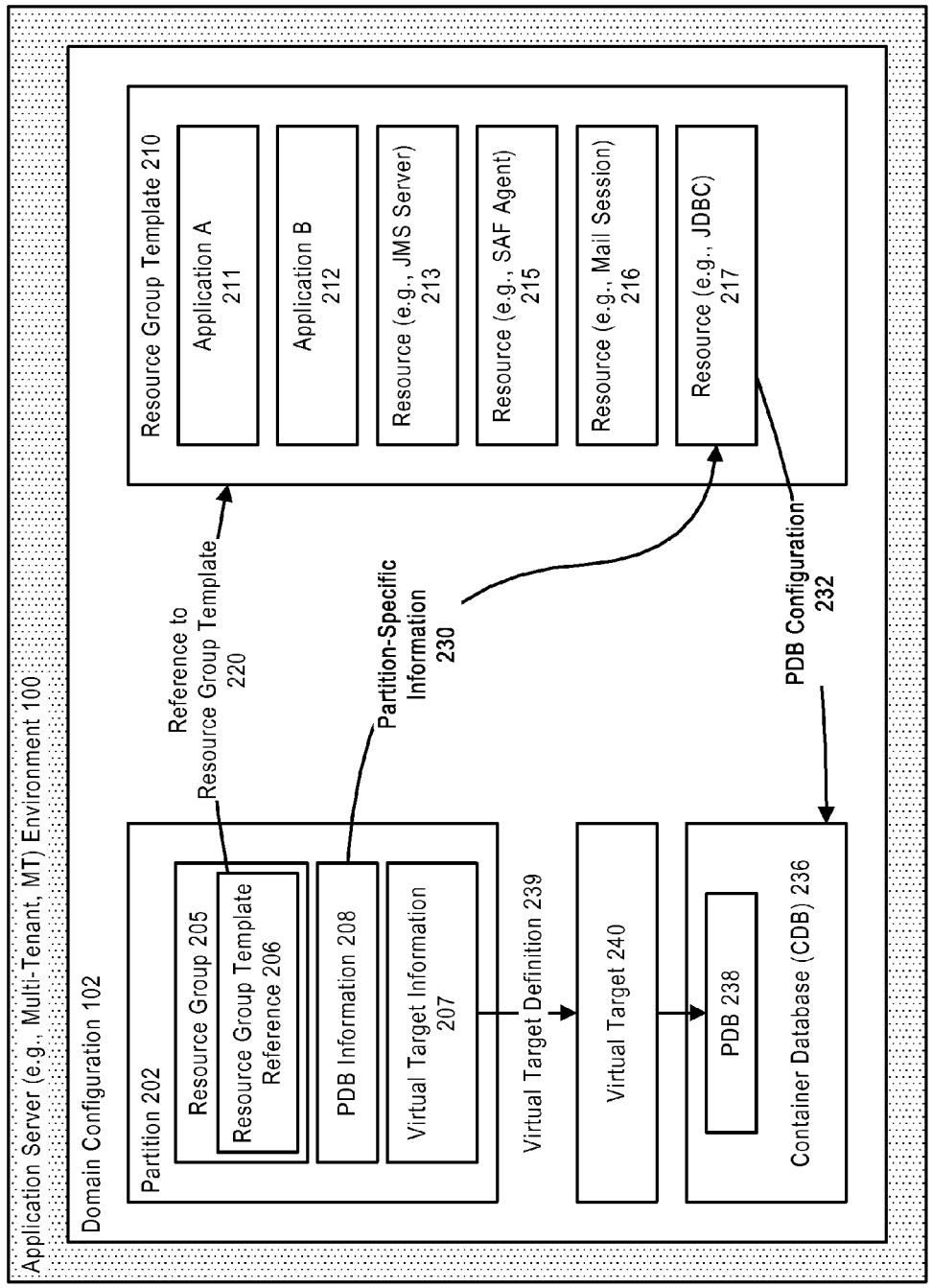
FIG. 2 further illustrates a system for supporting multi-tenancy in an application server, cloud, or other environment, in accordance with an embodiment.

FIG. 2 further illustrates a system for supporting multi-tenancy in an application server, cloud, or other environment, in accordance with an embodiment.

As illustrated in FIG. 2, in accordance with an embodiment, a partition 202 can include, for example, a resource group 205 which includes a reference 206 to a resource group template 210, a virtual target (e.g., virtual host) information 207, and a pluggable database (PDB) information 208. A resource group template (e.g., 210) can define, for example, a plurality of applications A 211 and B 212, together with resources such as a Java Message Server (JMS) server 213, store-and-forward (SAF) agent 215, mail session component 216, or Java Database Connectivity (JDBC) resource 217.

The resource group template illustrated in FIG. 2 is provided by way of example; in accordance with other embodiments, different types of resource group templates and elements can be provided.

In accordance with an embodiment, when a resource group within a partition (e.g., 202) references 220 a particular resource group template (e.g., 210), information associated with a particular partition can be used in combination with the referenced resource group template, to indicate a partition-specific information 230, for example a partition-specific PDB information. The partition-specific information can then be used by the application server to configure resources, for example a PDB resource, for use by the partition. For example, partition-specific PDB information associated with partition 202 can be used, by the application server, to configure 232 a container database (CDB) 236 with an appropriate PDB 238, for use by that partition.

Similarly, in accordance with an embodiment, a virtual target information associated with a particular partition can be used to define 239 a partition-specific virtual target 240, for use by the partition, e.g., baylandurgentcare.com, which can then be made accessible via a uniform resource locator (URL), e.g., baylandurgentcare.com.

Figure 3:
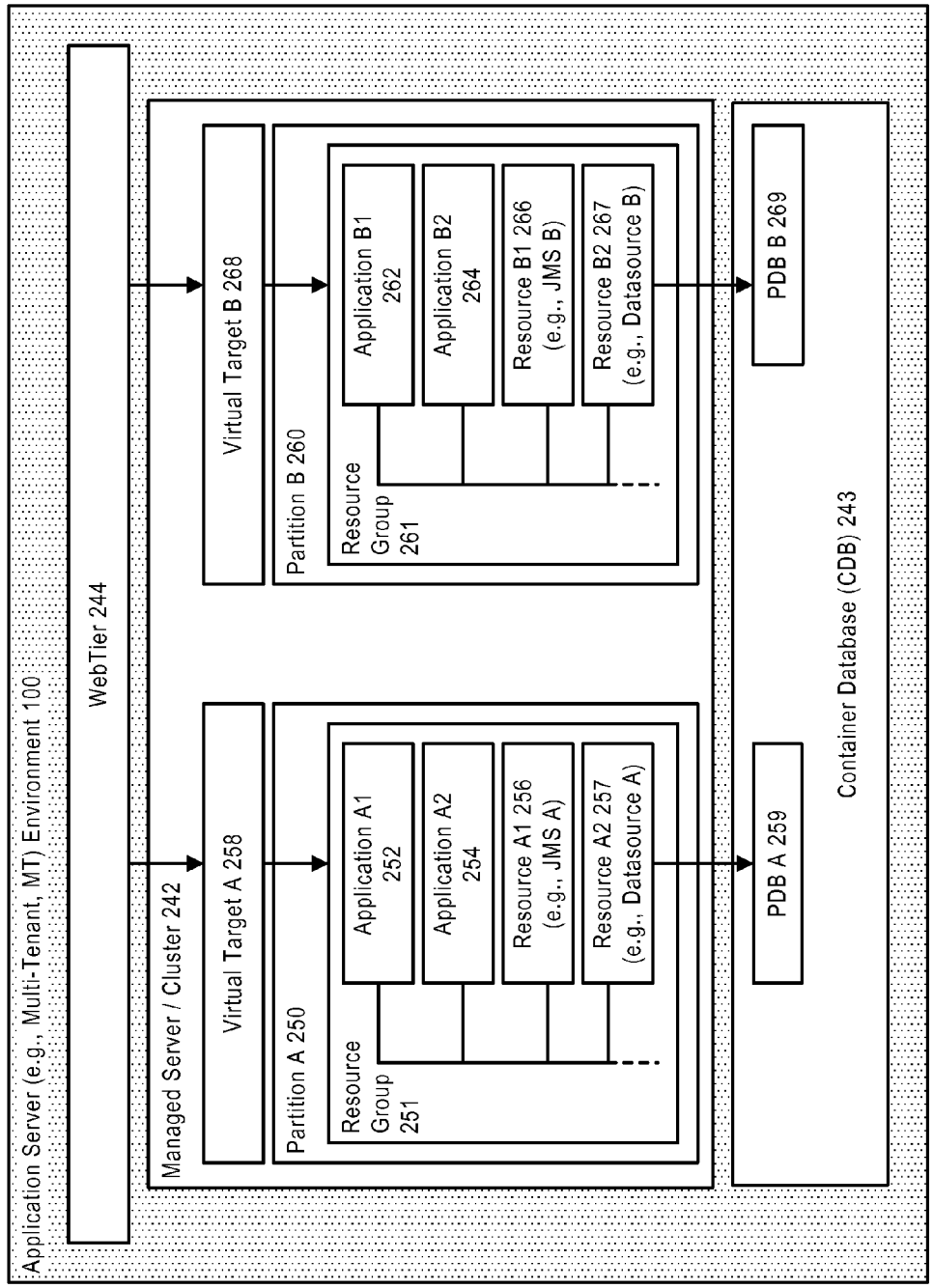
FIG. 3 further illustrates a system for supporting multi-tenancy in an application server, cloud, or other environment, in accordance with an embodiment.

FIG. 3 further illustrates a system for supporting multi-tenancy in an application server, cloud, or other environment, in accordance with an embodiment.

In accordance with an embodiment, a system configuration such as a config.xml configuration file, is used to define a partition, including configuration elements for resource groups associated with that partition, and/or other partition properties. Values can be specified per-partition using property name/value pairs.

In accordance with an embodiment, a plurality of partitions can be executed within a managed server/cluster 242, or a similar environment which can provide access to a CDB 243, and which are accessible via a web tier 244. This allows, for example, a domain or partition to be associated with one or more of the PDBs (of the CDB).

In accordance with an embodiment, each of the plurality of partitions, in this example partition A 250 and partition B 260, can be configured to include a plurality of resources associated with that partition. For example, partition A can be configured to include a resource group 251 which contains an application A1 252, application A2 254, and JMS A 256, together with a datasource A 257 associated with PDB A 259, wherein the partition is accessible via a virtual target A 258. Similarly, partition B 260 can be configured to include a resource group 261 which contains an application B1 262, application B2 264, and JMS B 266, together with a datasource B 267 associated with PDB B 269, wherein the partition is accessible via a virtual target B 268.

While several of the above examples illustrate use of CDB and PDBs, in accordance with other embodiments, other types of multi-tenant or non-multi-tenant databases can be supported, wherein a particular configuration can be provided for each partition, for example through the use of schemas, or the use of different databases.

Resources

In accordance with an embodiment, a resource is a system resource, application, or other resource or object that can be deployed to a domain of the environment. For example, in accordance with an embodiment, a resource can be an application, JMS, JDBC, JavaMail, WLDF, data source, or other system resource or other type of object that can be deployed to a server, cluster, or other application server target.

Partitions

In accordance with an embodiment, a partition is a runtime and administrative subdivision or slice of a domain that can be associated with a partition identifier (ID) and configuration, and can contain applications and/or refer to domain-wide resources through the use of resource groups and resource group templates.

Generally, a partition can contain its own applications, refer to domain wide applications via resource group templates, and have its own configuration. Partitionable entities can include resources, for example JMS, JDBC, JavaMail, WLDF resources, and other components, such as JNDI namespace, network traffic, work managers, and security policies and realms. In the context of a multi-tenant environment, the system can be configured to provide tenant access to the administrative and runtime aspects of partitions associated with a tenant.

In accordance with an embodiment, each resource group within a partition can optionally reference a resource group template. A partition can have multiple resource groups, and each of them can reference a resource group template. Each partition can define properties for configuration data that is not specified in the resource group templates to which the partition's resource groups refer. This enables the partition to act as a binding of deployable resources defined in a resource group template, to specific values for use with that partition. In some cases, a partition can override configuration information specified by a resource group template.

In accordance with an embodiment, a partition configuration, as defined for example by a config.xml configuration file, can include a plurality of configuration elements, for example: "partition", which contains the attributes and child elements that define the partition; "resource-group", which contains the applications and resources deployed to the partition; "resource-group-template", which contains applications and resources defined by that template; "jdbc-system-resource-override", which contains a database-specific service name, user name, and password; and "partition-properties", which contains property key values that can be used for macro replacement in resource group templates.

Upon startup, the system can use the information provided by the configuration file to generate partition-specific configuration elements for each resource, from the resource group template.

Resource Groups

In accordance with an embodiment, a resource group is a named, fully-qualified collection of deployable resources that can be defined either at a domain or partition level, and can reference a resource group template. The resources in a resource group are considered fully-qualified in that the administrator has provided all of the information needed to start or connect to those resources, for example the credentials for connecting to a data source, or the targeting information for an application.

A system administrator can declare resource groups at the domain level, or at the partition level. At the domain level, a resource group provides a convenient way to group related resources. The system can manage resources declared in a domain-level resource group the same as ungrouped resources, so that the resources can be started during system start-up, and stopped during system shut-down. An administrator can also stop, start, or remove a resource in a group individually, and can act on all the resources in a group implicitly by operating on the group. For example, stopping a resource group stops all of the resources in the group that are not already stopped; starting the resource group starts any resources in the group that are not already started; and removing the resource group removes all of the resources contained in the group.

At the partition level, a system or partition administrator can configure zero or more resource groups in a partition, subject to any security restrictions. For example, in a SaaS use case, various partition-level resource groups can refer to domain-level resource group templates; while in a PaaS use case, partition-level resource groups can be created that do not refer to resource group templates, but instead represent applications and their related resources that are to be made available within that partition only.

In accordance with an embodiment, resource grouping can be used to group together applications and the resources they use as a distinct administrative unit within the domain. For example, in the medical records (MedRec) application described below, a resource grouping defines the MedRec application and its resources. Multiple partitions can run the same MedRec resource group, each using a partition-specific configuration information, such that the applications that are part of each MedRec instance are made specific to each partition.

Resource Group Templates

In accordance with an embodiment, a resource group template is a collection of deployable resources that are defined at a domain level, that can be referenced from a resource group, and some of the information required to activate its resources may not be stored as part of the template itself, such that it supports the specification of partition level configuration. A domain can contain any number of resource group templates, each of which can include, for example, one or more related Java applications and the resources on which those applications depend. Some of the information about such resources may be the same across all partitions, while other information may vary from one partition to the next. Not all configuration need be specified at the domain level—partition level configuration can instead be specified in the resource group template through the use of macros, or property name/value pairs.

In accordance with an embodiment, a particular resource group template can be referenced by one or more resource groups. Generally, within any given partition, a resource group template can be referenced by one resource group at a time, i.e., not simultaneously by multiple resource groups within the same partition; however, it can be referenced at the same time by another resource group in a different partition. The object containing the resource group, e.g., the domain or partition, can use property name/value assignments to set the value of any tokens in the resource group template. When the system activates a resource group template using a referencing resource group, it can replace those tokens with values set in the resource group's containing object. In some cases, the system can also use statically-configured resource group templates and partitions to generate runtime configuration for each partition/template combination.

For example, in a SaaS use case, the system can activate the same applications and resources multiple times, including once for each partition that will use them. When an administrator defines a resource group template they can use tokens to represent the information that will be supplied elsewhere. For example, the username to use in connecting to a CRM-related data resource can be indicated in the resource group template as \${CRMDataUsername}.

Tenants

In accordance with an embodiment, in a multi-tenant environment, such as a multi-tenant (MT) application server environment, a tenant is an entity that can be represented by, or otherwise associated with, one or more partitions and/or one or more tenant-aware applications.

For example, tenants can represent distinct user organizations, such as different external companies, or different departments within a particular enterprise (e.g., HR and Finance departments), each of which can be associated with a different partition. A tenant globally unique identity (tenant ID) is the association of a particular user, at a particular moment in time, with a particular tenant. The system can derive which tenant a particular user belongs to from the user identity, for example by referring to a user identity store. The user identity enables the system to enforce those actions that a user is authorized to perform, including, but not limited to, which tenant the user may belong.

In accordance with an embodiment, the system enables isolation of the administration and runtime of different tenants from each other. For example, tenants can configure some behaviors of their applications, and resources to which they have access. The system can ensure that a particular tenant cannot administer artifacts belonging to another tenant; and, at runtime, that the applications working on behalf of a particular tenant refer only to resources associated with that tenant, and not to resources associated with other tenants.

In accordance with an embodiment, a tenant-unaware application is one that contains no logic dealing with tenants explicitly, such that any resources that the application uses may be accessible regardless of what user submitted a request to which the application is responding. In contrast, a tenant-aware application includes logic that explicitly deals with tenants. For example, based on a user's identity the application can derive the tenant to which the user belongs and use that information to access tenant-specific resources.

In accordance with an embodiment, the system enables users to deploy applications that are explicitly written to be tenant-aware, so that application developers can obtain the tenant ID of a current tenant. The tenant-aware application can then use the tenant ID to handle multiple tenants that are using a single instance of the application.

For example, the MedRec application, which supports a single doctor's office or hospital, can be exposed to two different partitions or tenants, e.g., a Bayland Urgent Care tenant, and a Valley Health tenant, each of which is able to access separate tenant-specific resources, such as separate PDBs, without changing the underlying application code.

Exemplary Domain Configuration and Multi-Tenant Environment

In accordance with an embodiment, applications can be deployed to a resource group template at the domain level, or to a resource group that is scoped to a partition or scoped to the domain. Application configuration can be overridden using deployment plans specified per-application, or per-partition.

Figure 4:
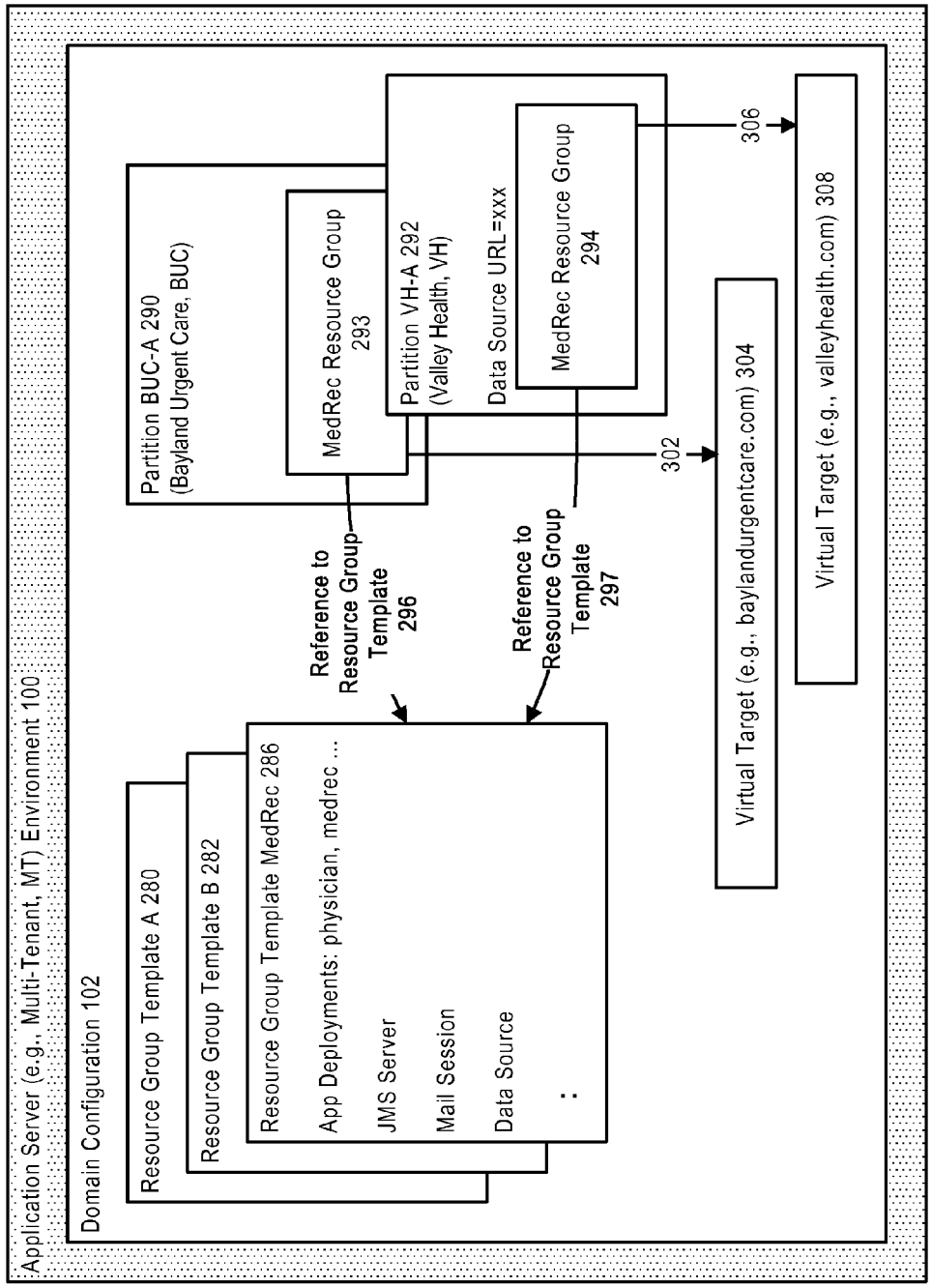
FIG. 4 illustrates a domain configuration for use with an exemplary multi-tenant environment, in accordance with an embodiment.

FIG. 4 illustrates a domain configuration for use with an exemplary multi-tenant environment, in accordance with an embodiment.

In accordance with an embodiment, when the system starts a partition, it creates virtual targets (e.g., virtual hosts) and connection pools, including one for each partition, to respective database instances, according to the provided configuration.

Typically, each resource group template can include one or more related applications and the resources on which those applications depend. Each partition can provide configuration data that is not specified in the resource group templates to which it refers, by providing a binding of the deployable resources in resource group templates to specific values associated with the partition; including, in some cases, overriding certain configuration information specified by the resource group template. This enables the system to activate an application represented by a resource group template differently for each partition, using the property values each partition has defined.

In some instances, a partition may contain resource groups that do not refer to resource group templates, or that directly define their own partition-scoped deployable resources. Applications and data sources that are defined within a partition are generally available only to that partition. Resources can be deployed so that they can be accessed from across partitions using partition:<partitionName>/<resource JNDI name>, or domain:<resource JNDI name>.

For example, a MedRec application can include a plurality of Java applications, a data source, a JMS server, and a mail session. To run the MedRec application for multiple tenants, the system administrator can define a single MedRec resource group template 286, declaring those deployable resources in the template.

In contrast to domain-level deployable resources, the deployable resources declared in a resource group template may not be fully configured in the template, or cannot be activated as-is, since they lack some configuration information.

For example, the MedRec resource group template may declare a data source used by the applications, but it may not specify a URL for connecting to the database. Partitions associated with different tenants, for example, partition BUC-A 290 (Bayland Urgent Care, BUC) and partition VH-A 292 (Valley Health, VH) can reference one or more resource group templates, by each including a MedRec resource group 293, 294 that references 296, 297 the MedRec resource group template. The reference can then be used to create 302, 306, the virtual targets/virtual hosts for each tenant, including a virtual host baylandurgentcare.com 304 associated with the BUC-A partition, for use by the Bayland Urgent Care tenant; and a virtual host valleyhealth.com 308 associated with the VH-A partition, for use by the Valley Health tenant.

Figure 5:
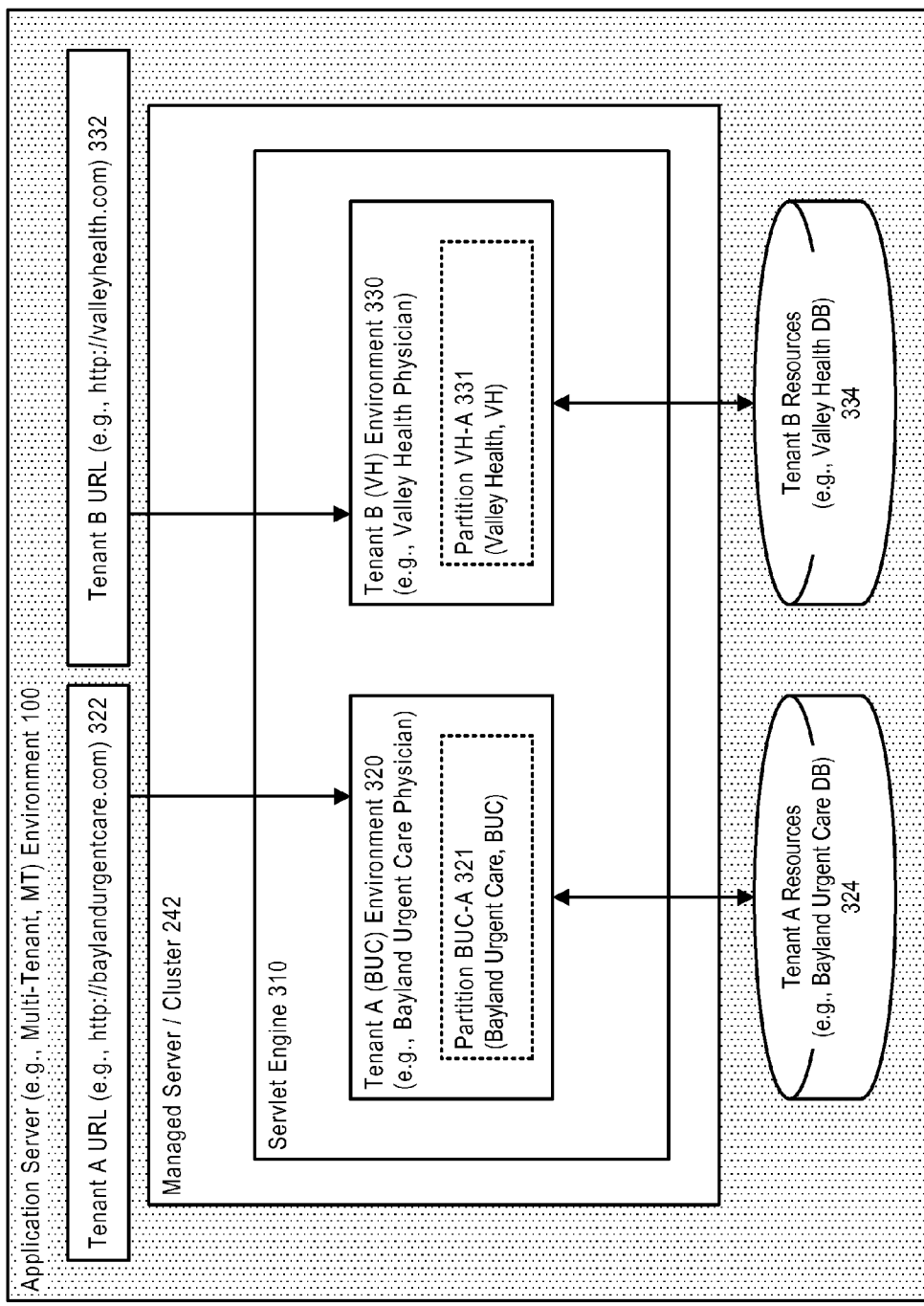
FIG. 5 further illustrates an exemplary multi-tenant environment, in accordance an embodiment.

FIG. 5 further illustrates an exemplary multi-tenant environment, in accordance with an embodiment. As illustrated in FIG. 5, and continuing the example from above, in which two partitions reference the MedRec resource group template, in accordance with an embodiment, a servlet engine 310 can be used to support a plurality of tenant environments, in this example a Bayland Urgent Care Physician tenant environment 320, and a Valley Health Physician tenant environment 330.

In accordance with an embodiment, each partition 321, 331 can define a different virtual target on which to accept incoming traffic for that tenant environment, and a different URL 322, 332 for connecting to the partition and to its resources 324, 334, including in this example either a bayland urgent care database, or a valley health database respectively. The database instances can use compatible schemas, since the same application code will execute against both databases. When the system starts the partitions, it can create the virtual targets and connection pools to the respective database instances.

Application Deployment

In accordance with an embodiment, described herein is a system and method for supporting deployment in a multi-tenant application server environment. A resource, for example an application or library, can be deployed to different resource groups in different partitions in a domain, to a resource group template which referenced by the different resource groups, or to a domain-level resource group. One or more additional deployment operations can be performed on a deployed resource by a partition administrator or a system administrator. A deployment API can be provided to enable a plurality to deployment clients to perform the deployment operations, and used to derive partition information and target information for the deployment operations when the information is not provided by a partition administrator. Different deployment scopes are defined to allow a same resource to be deployed in different partitions of a domain and outside any partition in the domain.

Figure 6:
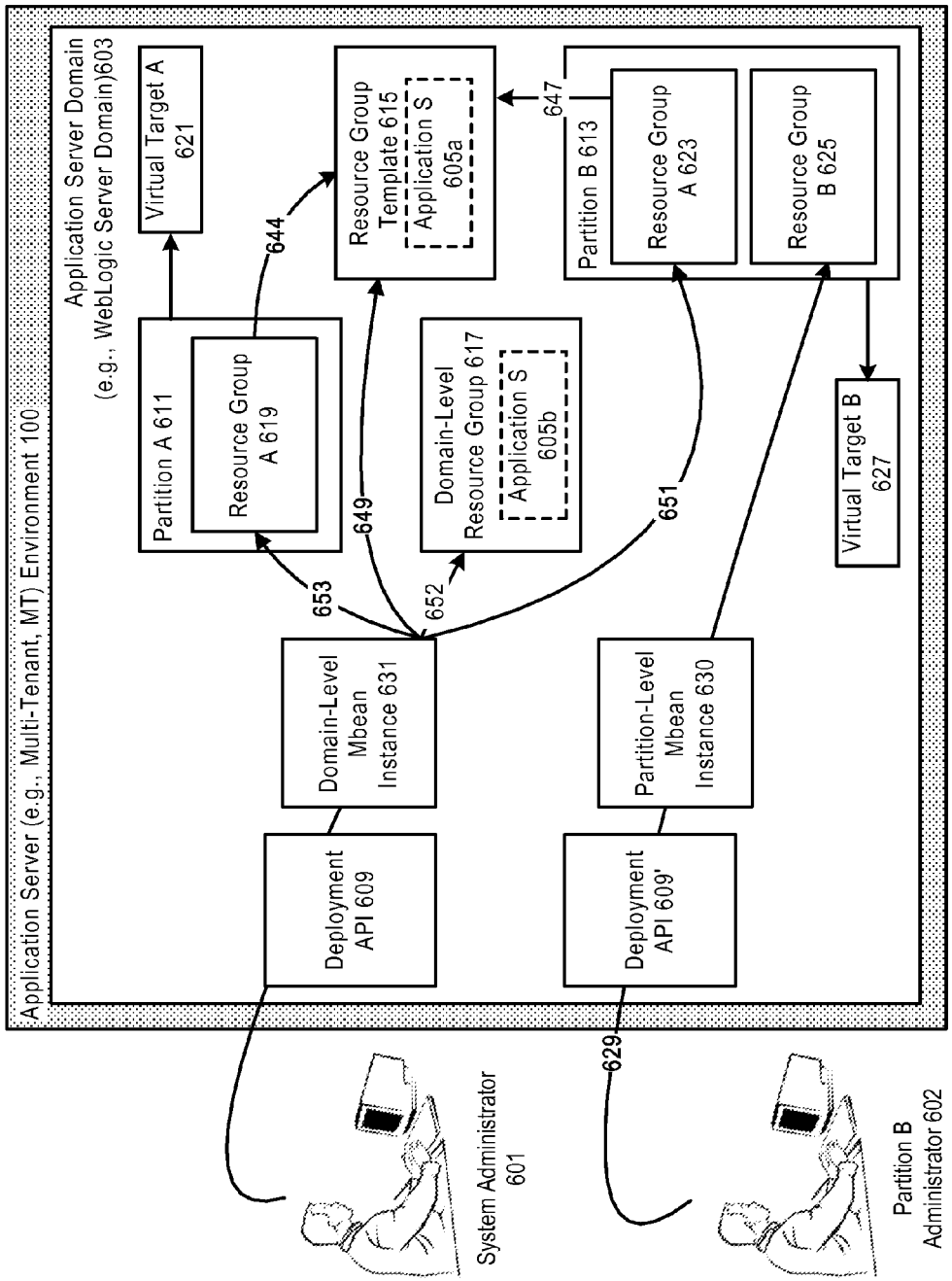
FIG. 6 illustrates a system for supporting resource deployment in an application server, cloud, or other environment, in accordance with an embodiment.

FIG. 6 illustrates a system for supporting resource deployment in an application server, cloud, or other environment, in accordance with an embodiment.

As shown in FIG. 6, a system administrator 601 can deploy a resource (for example, an application S 605a) to a resource group template (for example, a resource group template 615), which can be referenced by a resource group from one or more partitions. In accordance with an embodiment, the application S can include one or more modules.

In accordance with an embodiment, the resource group template can be referenced 644 by a resource group A 619 in partition A 611, and referenced 647 by a resource group A 623 in partition B 613. Each of the partition A and partition B is associated with a virtual target (for example, a virtual target 621 or 627), wherein each virtual target can represent configurations for an http server that hosts deployed resources for a partition.

In accordance with an embodiment, the system administrator can deploy 653, 651 the application S directly to the resource group A in partition A, and to the resource group B in partition B. The system administrator can also deploy 652 the application S 605b to a domain-level resource group 617.

As further shown in FIG. 6, a partition administrator (for example, a partition B administrator 602) can deploy 629 to a resource group (for example a resource group B 625) of a partition that the partition administrator is configured to manage.

In accordance with an embodiment, a partition-level Mbean instance 630 can be provided to limit the operation scope of a partition administrator. When a deployment operation is received from the partition administrator, the partition-level Mbean instance can provide constraints, for example security constraints, to limit the operation and associated lookups within the scope of the partition. Similarly, a domain-level Mbean instance 631 can be provided to limit the operation scope of the system administrator.

In accordance with an embodiment, the system supports a plurality of deployment operations: deploy, undeploy, redeploy, update, distribute, start and stop. In the SaaS use case, where a plurality of tenants or partitions share a common set of resources (applications or libraries) through one or more resource group templates, the start and stop operations are not supported. A resource group template is a configuration rather than a runtime construct, and the resources deployed therein are deployed to a referencing resource group in one or more partitions. As such, a start or stop operation can be performed at the resource group level.

In accordance with an embodiment, in a PaaS use case where a resource is deployed to a resource group within a partition, all the deployment operations, including start and stop, are supported.

In accordance with an embodiment, one or more deployment APIs 609 and 609' can be provided to support the deployment operations described above, and to enable a plurality of deployment clients to perform the deployment operations.

A sample list of deployment clients or deployment APIs can include a WebLogic deployer, WLST's deployment commands, JSR-88 API for deployment, JMX deployment API, WLDeploy ant task, Maven goals for deployment, an application server console (for example, WLS console), and a middleware web console (for example, FMWC).

Deployment to a Resource Group Template

Figure 7:
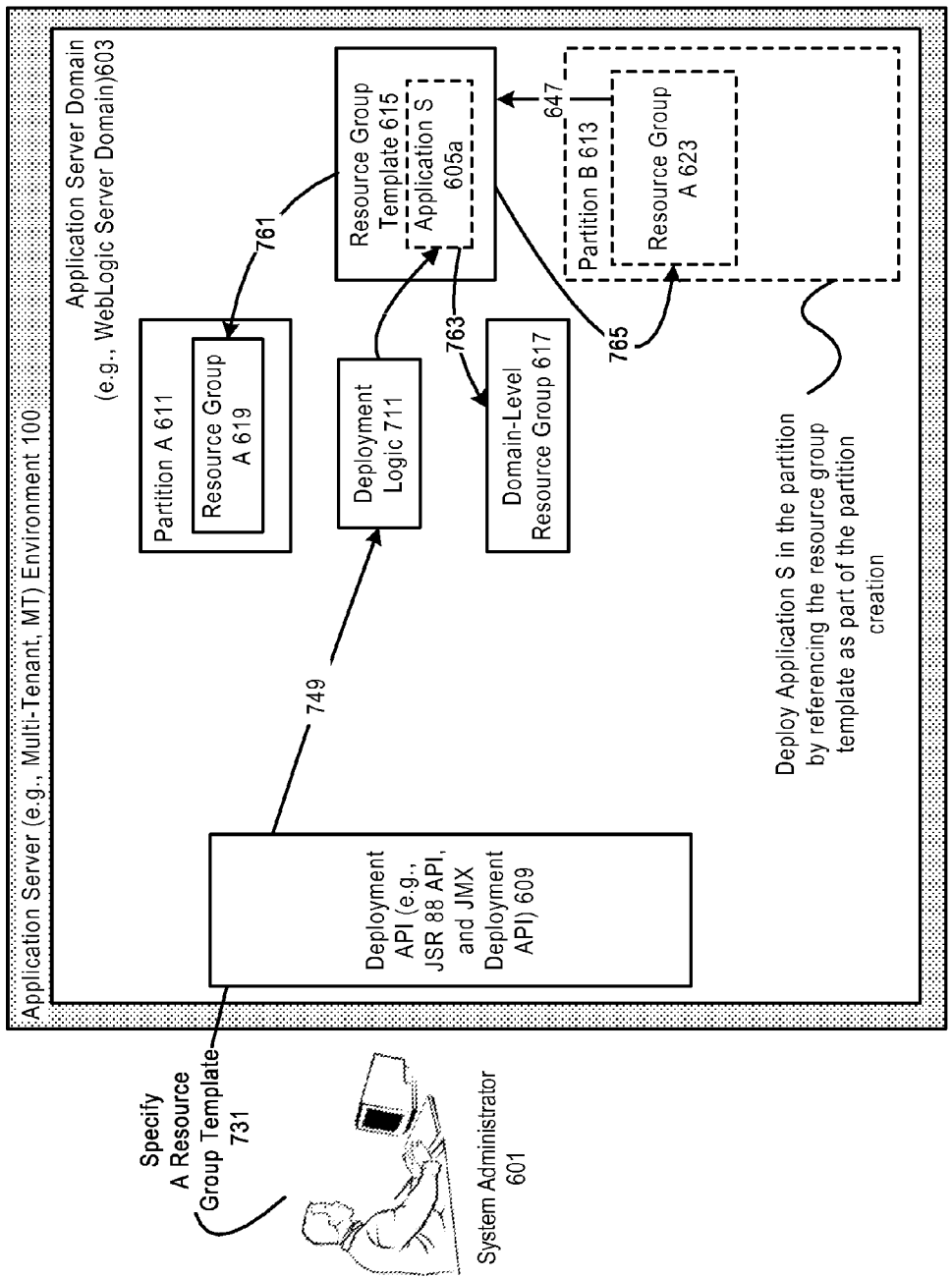
FIG. 7 further illustrates a system for supporting resource deployment in an application server, cloud, or other environment, in accordance with an embodiment.

FIG. 7 further illustrates a system for supporting resource deployment in an application server, cloud, or other environment, in accordance with an embodiment.

As shown in FIG. 7, when performing a deploy operation to a resource group template, the system administrator can specify 731 the name of the resource group template.

In accordance with an embodiment, there are two sequences in which a deployed resource in a resource group template can be deployed to a referencing resource group. In the first sequence, a deployment logic 711 can be invoked 749 as part of the deploy operation, to locate all the referencing resource groups, including partition-level resource groups (for example, the resource group A 619) and domain-level resource groups (for example, the resource group 617); and to deploy 761, 763 the resource (for example, the application S 605a) from the resource group template to the referencing resource groups.

In the second sequence, the resource is first deployed in the resource group template. A partition (for example, the partition B 613) is subsequently created with a resource group (for example, the resource group A 623). As part of the partition creation, the resource group A references the deployed resource. The referencing can cause the deployed resource to be deployed 765 in the referencing resource group.

In accordance with an embodiment, the system administrator can configure the resource group template to use one of the above-described sequences.

Figure 8:
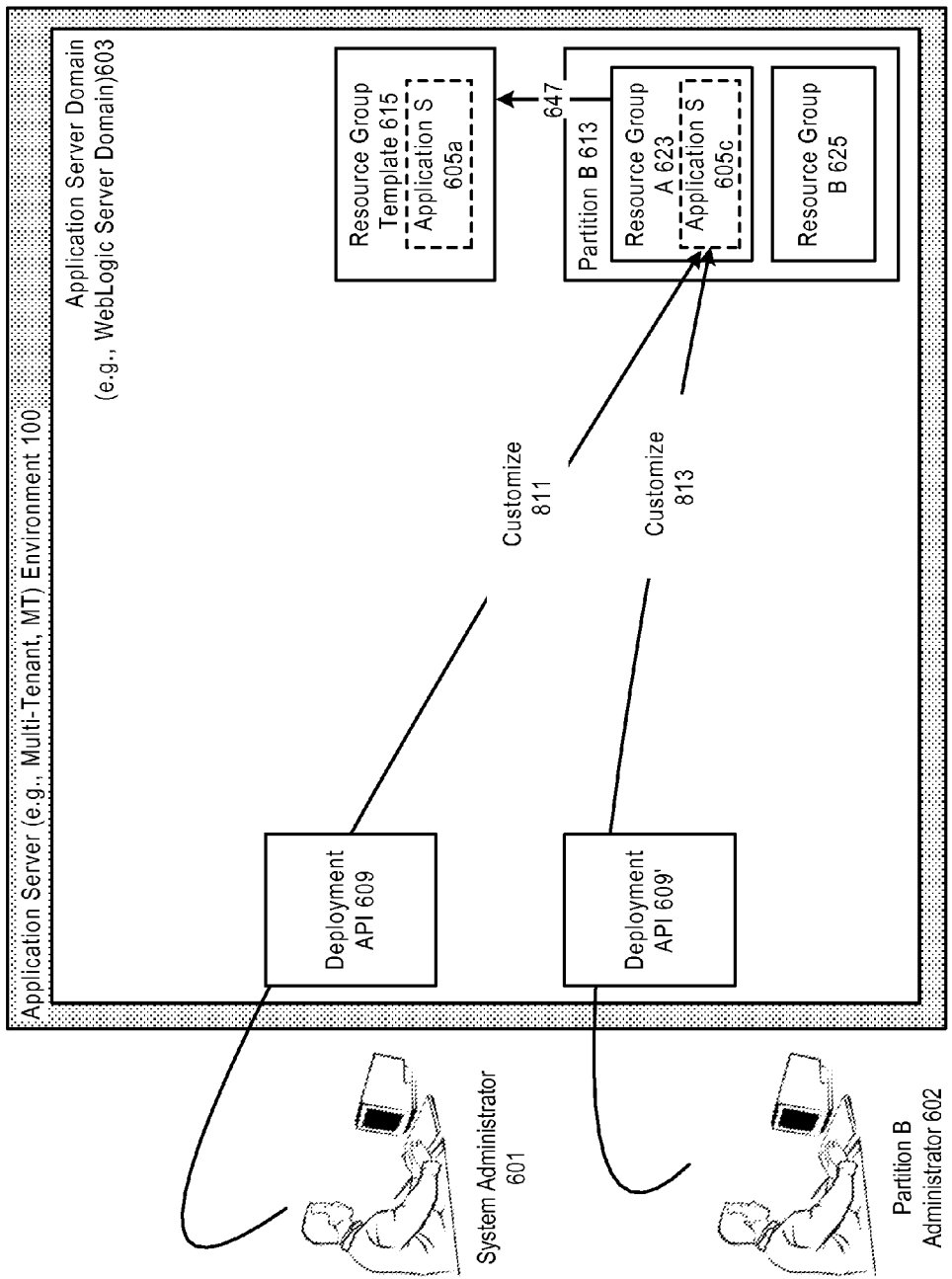
FIG. 8 further illustrates a system for supporting resource deployment in an application server, cloud, or other environment, in accordance with an embodiment.

FIG. 8 further illustrates a system for supporting resource deployment in an application server, cloud, or other environment, in accordance with an embodiment.

As described above, a system administrator can deploy a resource to a resource group template, which can be referenced by a resource group of a partition.

In accordance with an embedment, when a resource (for example, an application) is deployed from a resource group template to a referencing partition, the system administrator or the partition administrator can customize the resource.

As illustrated in FIG. 8, the application S 605a in the resource group template can be automatically deployed to the referencing resource group A 623 of the partition B as an application S 605c. The system administrator or the partition administrator for the partition B can customize 811, 813 the application by customizing an application deployment plan associated with the application, for example by overriding the resource's configuration defined at the resource group template level.

For example, the application deployment plan can be used to customize a servlet initiation parameter, so that a different display name for the resource can be used in the welcome page of the resource for a particular tenant associated with the partition B.

As an illustrative example, when an application is deployed to a resource group template, an application deployment plan option can be specified using the following command:

```
java weblogic.Deployer -deploy -name medrec -plan
/apps/medrec/plan.xml -resourceGroupTemplate
MedRecResourceTemplate <path-to-medrec-application>
```

The application deployment plan can subsequently be overridden for a referencing partition using the update command:

```
java weblogic.Deployer -update -name medrec -plan
/apps/medrec/bay-land-plan.xml -partition BayLandPartition
```

The overridden application deployment plan can be removed using the update command with the removePlanOverride option.

```
java weblogic.Deployer -update -name medrec -removePlanOverride
-partition BayLandPartition
```

In accordance with an embodiment, the update command can only be used for updating dynamic attributes of the application in the above overriding case. When it is necessary to update both dynamic and non-dynamic attributes of the application, the redeploy command can be used.

```
java weblogic.Deployer -redeploy -name medrec -plan
/apps/medrec/bay-land-plan.xml -partition BayLandPartition
```

The overridden application deployment plan can also be removed using the redeploy command with the removePlanOverride option.

```
java weblogic.Deployer -redeploy -name medrec -removePlanOverride
-partition BayLandPartition
```

Deployment to a Resource Group

Figure 9:
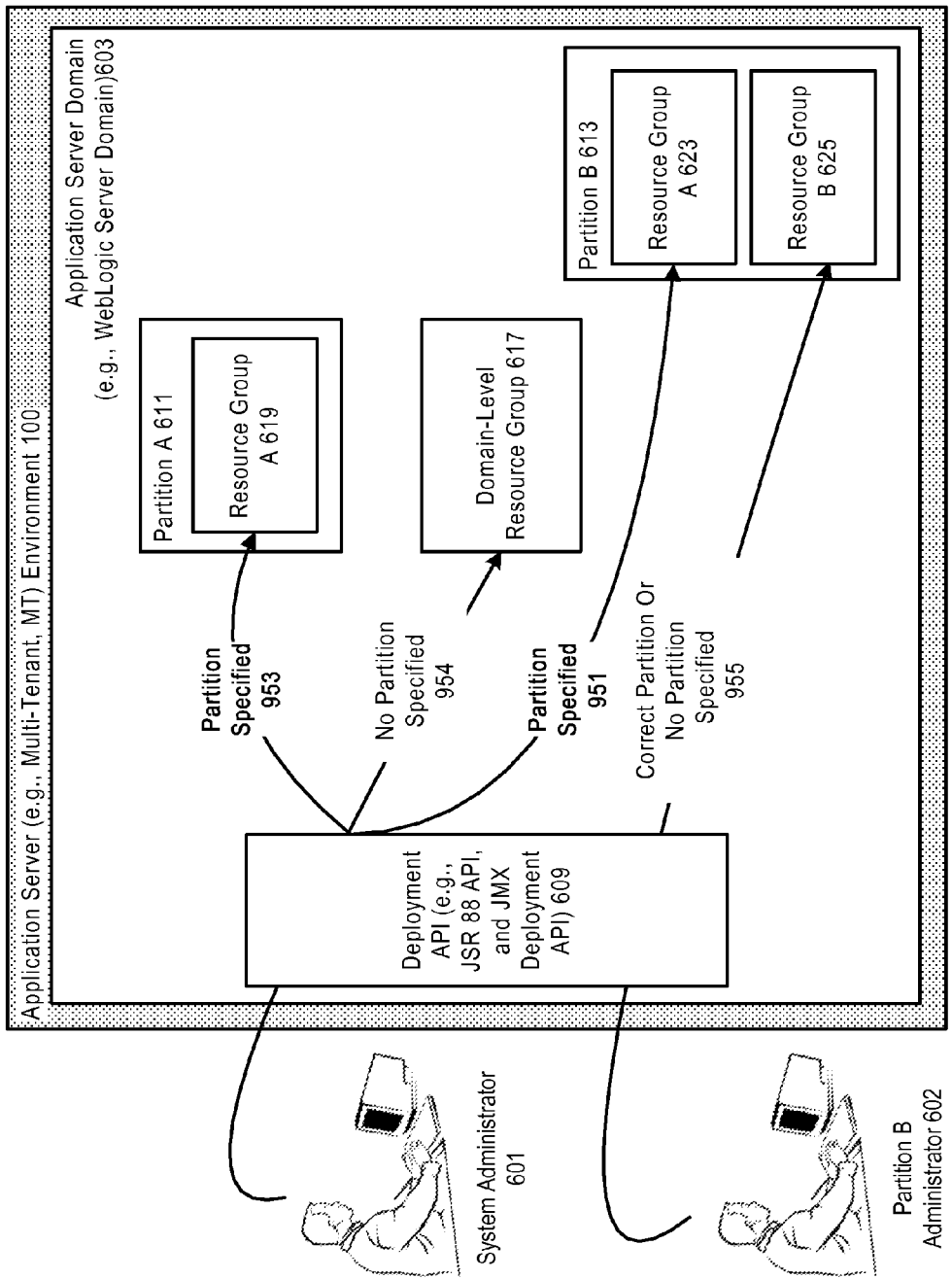
FIG. 9 further illustrates a system for supporting resource deployment in an application server, cloud, or other environment, in accordance with an embodiment.

FIG. 9 further illustrates a system for supporting resource deployment in an application server, cloud, or other environment, in accordance with an embodiment.

As shown in FIG. 9, in the PAAS use case, both the system administrator and a partition administrator can deploy a resource to a resource group of a particular partition. The system administrator can also deploy a resource to a domain-level resource group.

In accordance with an embodiment, a domain-level resource group can share the same characteristics as a partition-level resource group.

For example, each type of resource group can inherit from a resource group template. For each type of resource group, targeting is defined at a resource group level, and no targeting is allowed for individual resources targeted at that resource group. In addition, a same set of deployment operations, and a same set of deployment clients are supported for each type of resource group.

In accordance with an embodiment, for a partition administrator that uses a deployment client to perform a deployment operation, no partition information needs to be specified. The partition information can be derived from a connection URL that the partition administrator uses to connect to the partition.

In accordance with an embodiment, if the partition information is specified, the partition information can be validated by the deployment APIs. If the specified partition information is validated, the deployment operation can continue; otherwise, an error can be displayed, indicating that the partition administrator cannot operate in the partition as specified.

As shown in FIG. 9, when the partition B administrator does not specify the partition information, or specify the correct partition information 955, the deployment operation can proceed.

Similarly, for a system administrator that performs deployment operations to a domain-level resource group, the partition information does not need to be specified, as the domain-level resource group is not associated with any partition.

However, when the system administrator performs a deployment operation on a resource group of a partition, the partition needs to be specified 951 953. If the partition information is not specified 954, the resource can be defaulted to a domain-level resource group.

In accordance with an embodiment, for the system administrator or the partition administrator that operates on a resource group, the resource group information is required for the operations of deploy and distribute, as there can be more than one resource groups at the domain level or a partition level. The specified resource group options can be used to uniquely identify a particular resource group.

In accordance with an embodiment, for the operations of undeploy, redeploy, update, start and stop, which can be performed on an application that has already been deployed, the resource group option is not needed for either the system administrator or the partition administrator. The resource group information can be derived by the deployment APIs based on the uniqueness of a resource group. For example, given a deployed application, the resource group associated with the deployed application can be identified.

Figure 10:
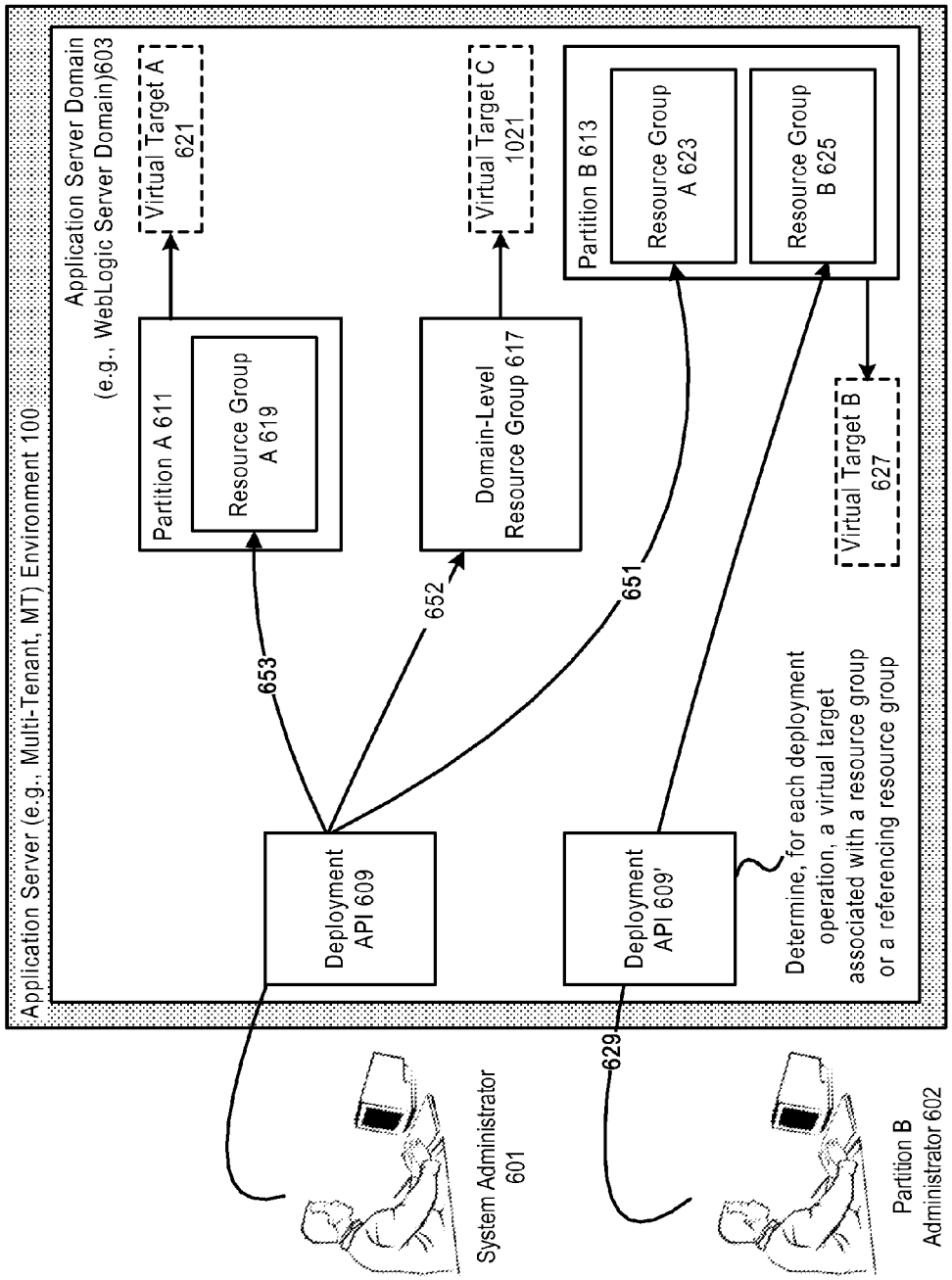
FIG. 10 further illustrates a system for supporting resource deployment in an application server, cloud, or other environment, in accordance with an embodiment.

FIG. 10 further illustrates a system for supporting resource deployment in an application server, cloud, or other environment, in accordance with an embodiment.

In accordance with an embodiment, when performing deployment operations in the application server environment, a resource target is not allowed to be specified. If a resource target is specified, an error will occur.

As described above, for a partition administrator that uses a deployment client to perform deployment operations, the deployment client can specify the partition information and the resource group information. The targets associated with the specified resource group can be used for hosting the deployed resource. The deployment APIs 609 and 609' can be used to determine the associated targets with the specified resource group.

In accordance with an embodiment, the targets can be virtual targets, for example virtual targets 621, 627, and 1021, each of which is associated with a resource group of a partition or a domain-level resource group. If no virtual target is defined for a resource group, the default target for the partition can be used.

The above approach can provide deployment flexibility as the system becomes more complex, for example, when an application needs to be deployed across multiple partitions. Regardless of the underlying associations between a partition and one or more virtual targets, a deployment client does not need to specify a target.

Modules Deployment

In accordance with an embodiment, when performing a deployment operation on an application resource that includes one or more modules, the modules can be specified as a comma separated list using an option (for example, —specifiedModules). If the deployment operation is successful, the comma separated list of specified module(s) can be deployed to the virtual targets associated with the referencing resource groups, or default targets for the partition if no virtual target is defined for the referencing resource groups.

As an illustrative example, an application with a deployable resource "school.ear" can include two web modules, /parents and /teachers. Using the deploy operation on the application with the option "—specifiedModules/parents", the /parents module can be made available on one or more virtual targets. A subsequent deploy operation with the option "—specifiedModules/teachers" can also make the /teachers module available on the virtual targets.

In accordance with an embodiment, an undeploy operation with the option "—specifiedModules/parents, /teachers" can make both the /parents and /teachers unavailable on the virtual targets.

In accordance with an embodiment, a Boolean property (for example, untargeted) can be introduced to Mbeans (for example, AppDeploymentMBean and SubDeploymentMBean), to define if an application or a module of the application deployed to a resource group template can be deployed in a referencing partition. The Boolean property can be set and unset using an option (for example, the specifiedModules option). The default value for the property for an application or a module is true.

In accordance with an embodiment, Listing 1 illustrates such a Boolean property.

Listing 1

```
AppDeploymentMBean:
/**
* <p>Only relevant for deployments in resource group templates.
* This flag, when specified with true, indicates that the app-deployment
* must not be deployed in the referring partition</p>
* @default false
* @return true if the app-deployment from a resource group template must
* stay untargeted.
*/
boolean isUntargeted( );
void setUntargeted(boolean value);
SubDeploymentMBean:
/**
* <p>Only relevant for deployments in resource group templates.
* Sub-deployments cannot have arbitrary targets if they are part of a
* deployment from resource group template. The sub-deployments, in
* such cases, may only be targeted to the virtual host of referring partition
* or stay untargeted. This flag, when specified with true, indicates that
* the sub-deployment must not be deployed in the referring partition</p>
* @default false
* @dynamic
* @return true if the sub-deployment from a deployment in resource
group
* template must stay untargeted.
*/
boolean isUntargeted( );
void setUntargeted(boolean value);
```

In accordance with an embodiment, listed below are examples of the domain configuration file (for example, config.xml) that includes such a Boolean property. These examples illustrates the same application (i.e. school.ear) that includes the two web modules, /parents and /teachers; and show which of the two modules are available on the virtual targets associated with the resource groups that reference the resource group template.

An example configuration file can be shown in Listing 2 below, when both modules are available for deployment to a referencing group:

Listing 2

```
<resource-group-template>
    <name>SchoolDistrict</name>
    <app-deployment>
        <name>school</name>
        <module-type>ear</module-type>
        <source-path>/tmp/school.ear</source-path>
        <sub-deployment>
            <name>/parents</name>
        </sub-deployment>
        <sub-deployment>
            <name>/teachers</name>
        </sub-deployment>
```

Listing 2 -continued

```
        <staging-mode xsi:nil="true"></staging-mode>
        <plan-staging-mode xsi:nil="true"></plan-staging-mode>
        <cache-in-app-directory>false</cache-in-app-directory>
            <untargeted>true</untargeted>
    </app-deployment>
</resource-group-template>
```

An example configuration file is shown in Listing 3 below, when both modules are unavailable for deployment to a referencing group:

Listing 3

```
<resource-group-template>
    <name>SchoolDistrict</name>
    <app-deployment>
        <name>school</name>
        <module-type>ear</module-type>
        <source-path>/tmp/school.ear</source-path>
        <sub-deployment>
            <name>/parents</name>
            <untargeted>true</untargeted>
        </sub-deployment>
        <sub-deployment>
            <name>/teachers</name>
            <untargeted>true</untargeted>
        </sub-deployment>
        <staging-mode xsi:nil="true"></staging-mode>
        <plan-staging-mode xsi:nil="true"></plan-staging-mode>
        <cache-in-app-directory>false</cache-in-app-directory>
            <untargeted>true</untargeted>
    </app-deployment>
</resource-group-template>
```

As shown in Listings 2 and 3, the untargeted property can be used to make a module available or unavailable on the virtual targets for the resource groups that reference the resource group template.

Figure 11:
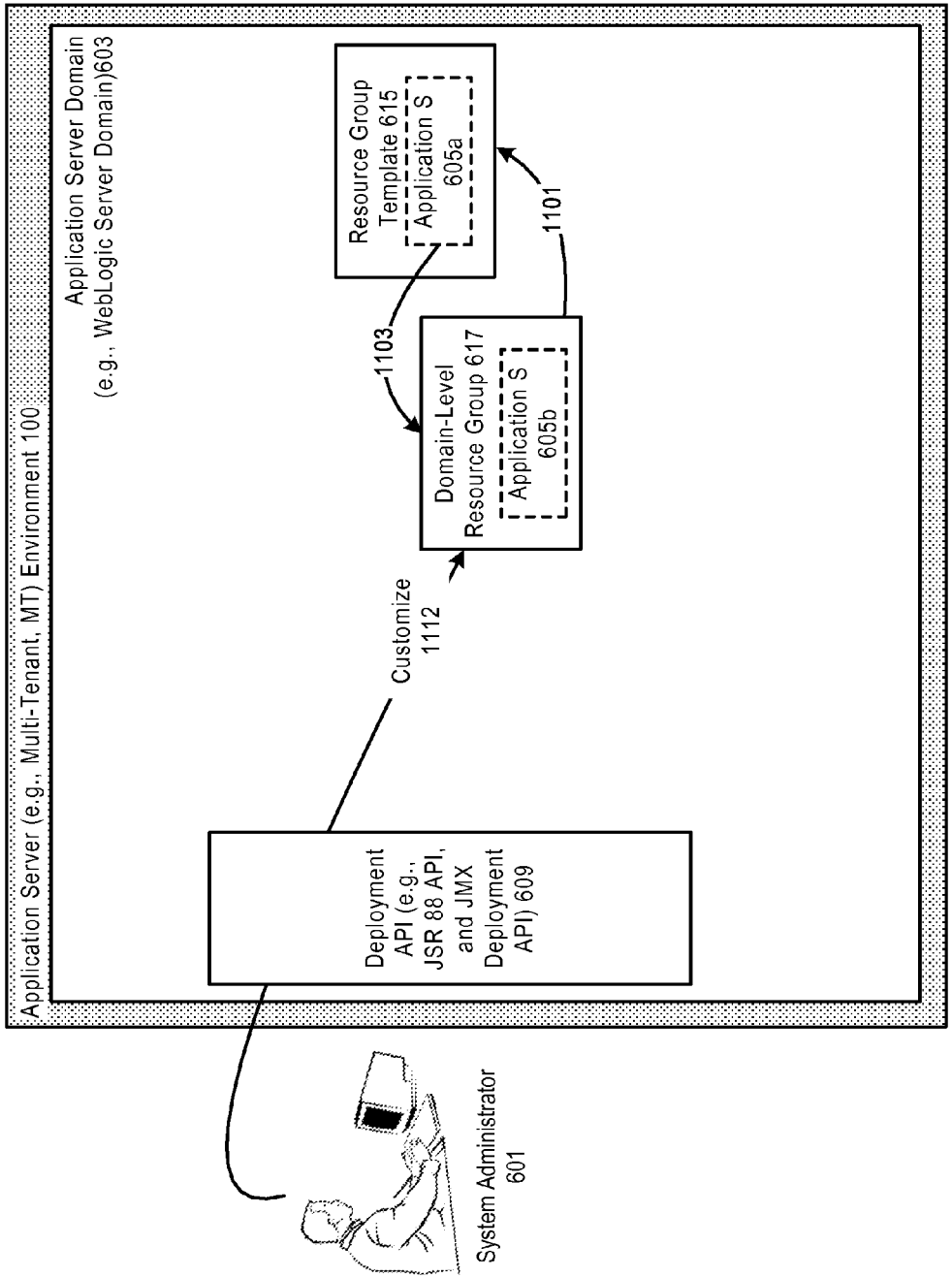
FIG. 11 further illustrates a system for supporting resource deployment in an application server, cloud, or other environment, in accordance with an embodiment.

FIG. 11 further illustrates a system for supporting resource deployment in an application server, cloud, or other environment, in accordance with an embodiment.

As illustrated in FIG. 11, a domain-level resource group (for example, the resource group 617) can reference 1101 a resource group template (for example, the resource group template 615), and the referencing can cause the application S 605a in the referenced resource group template to be deployed 1103 as the application S 605b in the referencing domain-level resource group.

In addition, a system administrator can customize 1112 the application S 605b by customizing an application deployment plan associated with the application, for example by overriding the application's configuration defined at the resource group template level.

Figure 12:
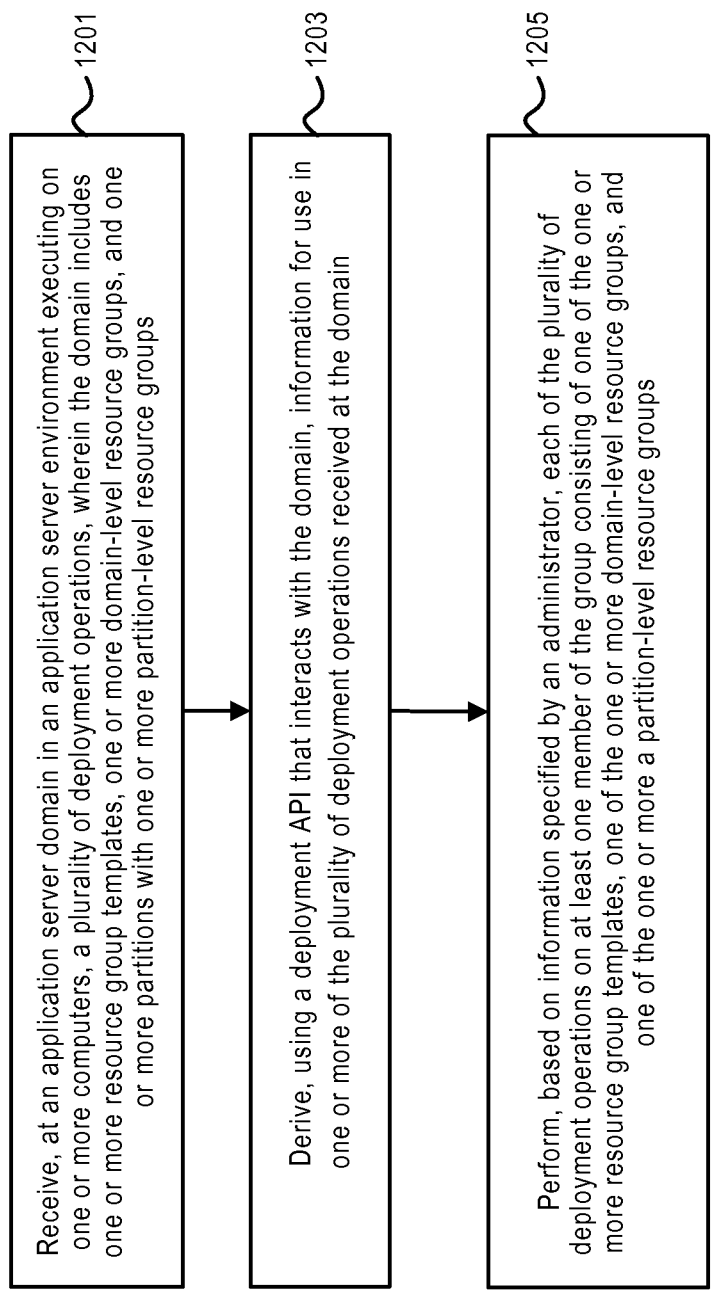
FIG. 12 illustrates a method for supporting resource deployment in an application server, cloud, or other environment, in accordance with an embodiment.

FIG. 12 illustrates a method for supporting resource deployment in an application server, cloud, or other environment, in accordance with an embodiment.

As shown in FIG. 12, at step 1201, a plurality of deployment operations are received at a domain in an application server environment executing on one or more computers, wherein the domain includes one or more resource group templates, one or more domain-level resource groups, and one or more partitions with one or more partition-level resource groups.

At step 1203, information for use in one or more of the plurality of deployment operations can be derived using a deployment API that interacts with the domain.

At step 1205, the method can continue with performing, based on information specified by an administrator, each of the plurality of deployment operations on at least one member of the group consisting of one of the one or more resource group templates, one of the one or more domain-level resource groups, and one of the one or more a partition-level resource groups.

Deployment Scopes

In accordance with an embodiment, a plurality of deployment scopes can be supported in an application server environment. The deployment scopes can include a partition scope, a resource group template scope, and a global runtime scope. In each scope, an application name needs to be unique; otherwise, an error will be generated.

For example, in a partition scope, an application name needs to be unique across different resource groups within the same partition. In a resource group template scope, an application name needs to be unique within the same resource group template. In a global runtime scope, an application name needs to be unique for the domain and any domain level resource group in the domain.

In accordance with an embodiment, for an application deployed to a partition, the internal application identifier can include the application name and the partition name, to ensure the application identifier is unique across partitions within the domain.

In accordance with an embodiment, although a domain and a domain-level resource group are treated differently at a configuration level, they are in the same scope at runtime. As such, if an application with a name is already in a domain, another application with the same name cannot be deployed to a domain-level resource group within the same domain.

In accordance with an embodiment, an application with a same name can be deployed in two different resource group templates. However, when a same partition references each resource group template for the application, an error will occur, as two applications with a same name cannot be deployed in a same partition scope.

Exemplary Implementation

In accordance with an embodiment, illustrated below is an implementation of the system for supporting resource deployment in an application server, cloud, or other environment, in accordance with an embodiment. The implementation is for illustration purposes and should not be construed to limit any of the embodiments of the invention.

In accordance with an embodiment, the whole set of deployment operations supported at the domain level (i.e. deploy, undeploy, redeploy, distribute, update, start, and stop) are supported for a system administrator that operates at a domain-level resource group or a partition-level resource group, and for a partition administrator.

For a system administrator that operates at a resource group template level, the operations of start and stop are not supported. The supported operations for the system administrator can be illustrated below.

For each of the supported deployment operations (i.e. deploy, undeploy, redeploy, update, and distribute), a new option for specifying a resource group template name is introduced. An operation fails if there is no resource group template by that name exists. In addition, for each of the supported deployment operations, a target is not allowed to be specified using the targets option for a resource to be deployed. The targets associated with referencing resource groups (or default targets at a partition level if no targets are defined at a resource group level) will be used.

Further, the following individual changes can be implemented for the deployment operations.

Deployment Operation: With a successful operation: 1. An AppDeploymentMBean for the application is created and added to the specified ResourceGroupTemplateMBean; 2. The application is deployed to the targets that are associated with referencing resource groups (or default targets at a partition level if no targets are defined at a resource group level).

Undeploy Operation: With a successful operation: 1. The AppDeploymentMBean for the application is removed from the specified ResourceGroupTemplateMBean and destroyed; 2. The application is be undeployed from the targets that are associated with referencing resource groups (or default targets at a partition level if no targets are defined at a resource group level).

Redeploy Operation: With a successful operation: 1. The AppDeploymentMBean for the application is updated; 2. The application is redeployed to the targets that are associated with referencing resource groups (or default targets at a partition level if no targets are defined at a resource group level).

Update Option: With a successful operation: 1. The AppDeploymentMBean for the application is updated as needed; 2. The application is updated on the targets that are associated with referencing resource groups (or default targets at a partition level if no targets are defined at a resource group level).

Distribute Operation: With a successful operation: 1. An AppDeploymentMBean for the application is created and added to the specified ResourceGroupTemplateMBean; 2. The application is distributed to the targets that are associated with referencing resource groups (or default targets at a partition level if no targets are defined at a resource group level).

Start and Stop: The start and stop are not supported at a resource group template level.

In accordance with an embodiment, interfaces of each of the deployment clients need to be modified to support the above described deployment operations.

weblogic.Deployer: A new option resourceGroupTemplate is added for performing deployment operations to a resource group template. For example:

```
java weblogic.Deployer -deploy -name <application_name>
-resourceGroupTemplate <resource_group_template_name>
path_to_application
```

WLST's deployment commands: A new option resourceGroupTemplate is added for performing deployment operations to a resource group template. For example:

```
deploy(appName=<application_name>,resourceGroupTemplate=
<resource_group_template_name>,path=<path_to_application>)
```

JSR-88 API for deployment: The following APIs are added for added for performing deployment operations to a resource group template:

```
weblogic.deploy.api.spi.DeploymentOptions.setResourceGroupTemplate
 (String)
weblogic.deploy.api.spi.DeploymentOptions.-
getResourceGroupTemplate( )
```

JMX Deployment API: A new option resourceGroupTemplate is added to the following Mbean for performing deployment operations to a resource group template: weblogic.management.runtime.DeploymentManagerMBean WLDeploy ant task: A new attribute resourceGroupTemplate is added for performing deployment operations to a resource group template. For example:

```
<wldeploy action="deploy" name=<application_name>
resourceGroupTemplate=<resource_group_template_name>source=
<path_to_application> />
```

Maven goals for deployment: A new parameter resourceGroupTemplate is added to the maven goals for performing deployment operations to a resource group template. For example:

```
Mvn com.oracle.weblogic:weblogic-maven-plugin:deploy
  -Dname=<application_name>
  -DresourceGroupTemplate=<resource_group_template_name>
  -Dsource=<path_to_application>
```

For a partition administrator or a system administrator that operates at a partition-level resource group level, the supported deployment operations can be illustrated below.

For each of the supported operations (i.e. deploy, undeploy, redeploy, distribute, update, start and stop), partition information needs to be specified for the system administrator, and can be optionally specified for the partition administrator. The partition name information for the partition administrator can be retrieved from the current invocation context when the option is not specified.

In addition, for each of the supported deployment operations, a target is not allowed to be specified using the targets option for a resource to be deployed. The targets associated with referencing resource groups (or default targets at a partition level if no targets are defined at a resource group level) will be used.

Further, the following individual changes can be implemented for the deployment operations.

Deploy Operation: A new option for specifying a resource group name is introduced. The resource group option is optional if there is one and only one resource group in the specified partition. However, the operation fails if a specified resource group does not exist in the specified partition, or a resource group option is not specified when there are more than one resource groups or no resource group in the specified partition. With a successful operation: 1. An AppDeploymentMBean for the application is created and added to the specified ResourceGroupMBean that is under the specified PartitionMBean; 2. The application is deployed to the targets associated with the resource group (or default targets at a partition level if no targets are defined at a resource group level).

Undeploy Operation: There is no need to specify a resource group option. The resource group value can be derived from the application name and partition name as the application name needs to be unique within the partition. With a successful operation: 1. The AppDeploymentMBean for the application is removed from the specified ResourceGroupMBean that is under the specified PartitionMBean and destroyed; 2. The application is undeployed from the targets associated with the resource group (or default targets at a partition level if no targets are defined at a resource group level).

Redeploy Operation: There is no need to specify a resource group option. The resource group value can be derived from the application name and partition name as the application name needs to be unique within the partition. With a successful operation: 1. The AppDeploymentMBean for the application is updated; 2. The application is redeployed to the targets associated with the resource group (or default targets at a partition level if no targets are defined at a resource group level).

Update Operation: There is no need to specify a resource group option. The resource group value can be derived from the application name and partition name as the application name needs to be unique within the partition. With a successful operation: 1. The AppDeploymentMBean for the application is updated as needed; 2. The application is updated on the targets associated with the resource group (or default targets at a partition level if no targets are defined at a resource group level). The update operation can be used to override application configurations from a resource group template at a resource group level.

Distribute Operation: A new option for specifying a resource group name is introduced. The resource group option is optional if there is one and only one resource group in the specified partition. However, the operation fails if a specified resource group does not exist in the specified partition, or a resource group option is not specified when there are more than one resource groups or no resource group in the specified partition. With a successful operation: 1. An AppDeploymentMBean for the application is created and added to the specified ResourceGroupTemplateMBean that is under the specified PartitionMBean. 2. The application is distributed to the targets associated with the resource group (or default targets at a partition level if no targets are defined at a resource group level).

Start Operation: There is no need to specify a resource group option. The resource group value can be derived from the application name and partition name as the application name needs to be unique within the partition. With a successful operation: 1. The application is started on the targets associated with the resource group (or default targets at a partition level if no targets are defined at a resource group level).

Stop Operation: There is no need to specify a resource group option. The resource group value can be derived from the application name and partition name as the application name needs to be unique within the partition. With a successful operation: 1. The application will be stopped on the targets associated with the resource group (or default targets at a partition level if no targets are defined at a resource group level).

In accordance with an embodiment, interfaces of each of the deployment clients need to be modified to support the above described operations.

weblogic.Deployer: A new option partition is added for performing deployment operations to a resource group of a partition. The partition option is optional for partition administrator. A new option resourceGroup is added for the deploy and distribute operations, and for these two operations, the resourceGroup option is optional if there is one and only one resource group in the specified partition. For example:

```
java weblogic.Deployer -deploy -name <application_name>
-partition <partition_name> path_to_application
```

Additional changes for update and redeploy commands: for removing the plan customization, a new option removePlanOverride is added.

WLST's deployment: A new option partition is added for performing deployment operations to a resource group of a partition. The partition option is optional for partition administrator. A new option resourceGroup is added for the deploy and distribute operations, and for these two operations, the resourceGroup option is optional if there is one and only one resource group in the specified partition.

```
deploy(appName=<application_name>, partition=<partition_name>,
resourceGroup=<resource_group_name>,path=<path_to_application>)
```

Additional changes for update and redeploy commands: for removing the plan customization, a new option removePlanOverride is added.

JSR-88 API for deployment: APIs are added for partition option for performing deployment operations to a resource group of a partition; for resource group option for deploy and distribute operations; and for remove plan option:

```
weblogic.deploy.api.spi.DeploymentOptions.setPartition(String)
weblogic.deploy.api.spi.DeploymentOptions.getPartition( )
weblogic.deploy.api.spi.DeploymentOptions.setResourceGroup(String)
weblogic.deploy.api.spi.DeploymentOptions.getResourceGroup( )
weblogic.deploy.api.spi.DeploymentOptions.setRemovePlanOverride
(boolean)
weblogic.deploy.api.spi.DeploymentOptions.isRemovePlanOverride( )
```

JMX Deployment API: Two new options (resourceGroup and removePlanOverride) are added to the Mbean weblogic.management.runtime.DeploymentManagerMBean for performing deployment operations to a resource group of a partition, and for removing plan customization in a partition.

WLDeploy ant task: A new attribute partition is added for performing deployment operations to a resource group of a partition. The partition option is optional for partition administrator. A new attribute resourceGroup is added for deploy and distribute operations, and for these two operations, the attribute resourceGroup is optional if there is one and only one resource group in the specified partition. For example:

```
<wldeploy action="deploy" name=<application_name>
partition=<partition_name>resourceGroup=<resource_group_name>
source=<path_to_application> />
```

Additional changes for update and redeploy commands: for removing the plan customization, a new attribute removePlanOverride will be added.

Maven goals for deployment: A new parameters partition is added to the maven goals for performing deployment operations to a resource group of a partition. The partition option is optional for partition administrator. A new parameter resourceGroup will be added for deploy and distribute operations, and for these two operations, the resourceGroup parameter is optional if there is one and only one resource group in the specified partition. For example:

```
mvn com.oracle.weblogic:weblogic-maven-plugin:deploy
-name=<application_name> -Dpartition=<partition_name>
-DresourceGroup=<resource_group_name>
-Dsource=<path_to_application>
```

Additional changes for update and redeploy commands: for removing the plan customization, a new parameter removePlanOverride will be added and parameter plan will be optional.

In accordance with an embodiment, a partition administrator can only perform operations on applications in a domain of the partition administrator, not global applications or applications from other partitions.

As such, the implementations of the relevant JSR-88 APIs, JMX Deployment APIs and other deployment domain mbean APIs need to be updated to provide a restricted view to enforce the separation.

For example, for APIs that are used to return a list of applications or targets, only applications and targets in the current partition are returned. For APIs that are used to perform operations on a specific application, the operations can only be performed if the application is in the current partition.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A system for supporting deployment in an application server environment, comprising:

one or more computers, including an application server environment executing thereon; an application server domain, in the application server environment, that includes
a resource group template,
a domain-level resource group, and
a partition with a partition-level resource group,
wherein the resource group template defines a resource and is configured to be referenced by the domain-level resource group and the partition-level group, and
wherein the referencing causes the defined resource in the resource group template to be deployed in each of the domain-level resource group and the partition-level resource group;
a deployment application programming interface (API) that interacts with the domain to derive information for use in one or more of a plurality of deployment operations received at the domain;
wherein each of the plurality of deployment operations is performed on at least one member of the group consisting of the resource group template, the one domain-level resource group, and the partition-level resource group; and
wherein each of the plurality of deployment operations is based on at least one of information received from an administrator and information derived from the deployment API.

2. The system of claim 1, wherein the administrator is selected from the group consisting of a system administrator and a partition administrator.

3. The system of claim 1, wherein the plurality of deployment operations include a deploy operation, an undeploy operation, a redeploy operation, an update operation, and a distribute operation.

4. The system of claim 1, wherein the administrator uses one or more deployment clients to perform the plurality of deployment operations, wherein the one or more deployment clients are selected from the group consisting of a deployer application, deployment commands, JSR-88 API, JMX deployment API, ant tasks, Maven goals for deployment, an application server console, and a middleware web console.

5. The system of claim 1, wherein the derived information includes information for the partition and information for a virtual target associated with the partition-level resource group.

6. The system of claim 5, further comprising one or more resources to be deployed to at least one of the resource group template, the domain-level resource group, and the partition-level resource group.

7. The system of claim 6, wherein each of the one or more resources is one of an application, and a library.

8. The system of claim 6, wherein a deployed resource in the resource group template can be customized by a member from the group consisting a partition administrator and a system administrator.

9. The system of claim 6, wherein when the resource includes one or more modules, the one or more modules comprises a comma separated list.

10. The system of claim 6, wherein an instance of a runtime Mbean is created when a resource is deployed to a partition.

11. A method for supporting deployment in an application server environment, comprising:
receiving, at an application server domain in an application server environment executing on one or more computers, a plurality of deployment operations, wherein the domain includes
a resource group template,
a domain-level resource group, and
a partition with a partition-level resource group,
wherein the resource group template defines a resource and is configured to be referenced by the domain-level resource group and the partition-level group and
wherein the referencing causes the defined resource in the resource group template to be deployed in each of the domain-level resource group and the partition-level resource group;
deriving, using a deployment application programming interface (API) that interacts with the domain, information for use in one or more of the plurality of deployment operations received at the domain; and
performing, based on information specified by an administrator, each of the plurality of deployment operations on at least one member of the group consisting of one of the resource group template, the domain-level resource group, and the partition-level resource group.

12. The method of claim 11, wherein the administrator is selected from the group consisting of a system administrator, and a partition administrator.

13. The method of claim 11, wherein the plurality of deployment operations include a deploy operation, an undeploy operation, a redeploy operation, an update operation, and a distribute operation.

14. The method of claim 11, wherein the administrator uses at least one deployment client to perform the deployment operations, wherein the at least one deployment client is selected from the group consisting of a deployer application, deployment commands, JSR-88 API, JMX deployment API, ant tasks, Maven goals for deployment, an application server console, and a middleware web console.

15. The method of claim 11, wherein the derived information includes information for the partition and information for a virtual target associated with the partition-level resource group.

16. The method of claim 15, further comprising one or more resources to be deployed to at least one location from the group of locations consisting of one of the resource group template, the domain-level resource group, and the partition-level resource group.

17. The method of claim 16, wherein each of the resources one of an application and a library.

18. The method of claim 16, wherein a deployed resource in the resource group template can be customized by a member from the group consisting a partition administrator and a system administrator.

19. The method of claim 16, wherein when the resource includes one or more modules, the one or more modules comprises a comma separated list.

20. A non-transitory computer readable storage medium, including instructions stored thereon which when read and executed by one or more computers cause the one or more computers to perform the steps comprising:
receiving, at an application server domain in an application server environment executing on one or more computers, a plurality of deployment operations, wherein the domain includes
a resource group template,
a domain-level resource group, and
a partition with a partition-level resource group,
wherein the resource group template defines a resource and is configured to be referenced by the domain-level resource group and the partition-level group and wherein the referencing causes the defined resource in the resource group template to be deployed in each of the domain-level resource group and the partition-level resource group;

deriving, using a deployment application programming interface (API) that interacts with the domain, information for use in one or more of the plurality of deployment operations received at the domain; and performing, based on information specified by an administrator, each of the plurality of deployment operations on at least one member of the group consisting of the resource group template, the domain-level resource group groups, and the partition-level resource group.

* * * * *

UNITED STATES PATENT AND TRADEMARK OFFICE
CERTIFICATE OF CORRECTION

PATENT NO. : 9,792,099 B2
APPLICATION NO. : 14/747718
DATED : October 17, 2017
INVENTOR(S) : Zhang et al.

Page 1 of 1

It is certified that error appears in the above-identified patent and that said Letters Patent is hereby corrected as shown below:

In the Claims

Column 21, Line 22, Claim 1 after "the" delete "one".

Column 22, Line 19-20, Claim 11 after "consisting of" delete "one of".

Column 23, Line 14, Claim 20 after "group" delete "groups".

Signed and Sealed this
Second Day of July, 2019

Andrei Iancu
*Director of the United States Patent and Trademark Office*